United States Patent [19]
Christiansen

[11] Patent Number: 5,815,077
[45] Date of Patent: Sep. 29, 1998

[54] ELECTRONIC COLLAR FOR LOCATING AND TRAINING ANIMALS

[75] Inventor: Erik P. Christiansen, West Des Moines, Iowa

[73] Assignee: B.E.R.T.S. Inc., West Des Moines, Iowa

[21] Appl. No.: 754,280

[22] Filed: Nov. 20, 1996

Related U.S. Application Data

[60] Provisional application No. 60/007,404 Nov. 21, 1995.

[51] Int. Cl.$^6$ .................................................. G08B 23/00
[52] U.S. Cl. ................ 340/573; 340/384.2; 340/825.76; 119/712; 119/718; 119/719; 119/720; 455/100; 455/352
[58] Field of Search ...................................... 340/573, 574, 340/384.1, 384.2, 384.3, 384.5, 384.6, 384.7, 384.71, 825.48, 825.72, 825.73, 825.74, 825.76, 825.75; 119/718, 719, 720, 721, 712; 455/45, 100, 92, 352, 353, 355

[56] References Cited

U.S. PATENT DOCUMENTS

| | | |
|---|---|---|
| D. 298,872 | 12/1988 | Cassel et al. . |
| 3,589,337 | 6/1971 | Doss . |
| 3,608,524 | 9/1971 | Waltz . |
| 3,673,567 | 6/1972 | McClellan . |
| 4,202,293 | 5/1980 | Gonda et al. . |
| 4,335,682 | 6/1982 | Gonda et al. . |
| 4,399,432 | 8/1983 | Lunn ......................................... 340/573 |
| 4,440,160 | 4/1984 | Fischell et al. . |
| 4,524,773 | 6/1985 | Fischell . |
| 4,539,937 | 9/1985 | Workman . |
| 4,794,402 | 12/1988 | Gonda et al. . |
| 4,802,482 | 2/1989 | Gonda et al. . |
| 4,887,549 | 12/1989 | Powell ..................................... 119/718 |
| 4,898,120 | 2/1990 | Brose ...................................... 119/859 |
| 4,947,795 | 8/1990 | Farkas . |
| 4,967,696 | 11/1990 | Tobias ..................................... 119/719 |
| 5,054,428 | 10/1991 | Farkus . |
| 5,061,918 | 10/1991 | Hunter .................................... 340/573 |
| 5,099,797 | 3/1992 | Gonda . |
| 5,193,484 | 3/1993 | Gonda . |
| 5,351,653 | 10/1994 | Marischen et al. ...................... 119/719 |
| 5,353,744 | 10/1994 | Custer .................................... 119/719 |

Primary Examiner—Nina Tong
Attorney, Agent, or Firm—Zarley, McKee, Thomte, Voorhees & Sease

[57] ABSTRACT

A device for locating and training an animal includes a hand held transmitter and a multi-function electronic collar assembly to be worn by the animal. The electronic collar assembly includes a receiver for receiving signals from the transmitter. A microprocessor connected to the receiver processes the signals and is connected to a sounder, a sound sensor, a electroshock stimulator, and a motion sensor mounted on the collar. The transmitter can program the collar assembly and command it in one of several modes or functions for locating and training the animal. In the locating or sounder mode, the sounder emits humanly audible sounds to indicate the location of the animal. In one training mode, the sound sensor detects when the animal is making undesirable noises, such as barking, and the microprocessor has the stimulator deliver a shock to the animal for barking control. In another training mode, the motion sensor detects whether the animal is in a pointing position and the microprocessor, sounder, and stimulator reward the animal with a tone or apply a shock accordingly. Heretofore, such a combination of hardware and functions have not been provided on a single collar assembly.

22 Claims, 2 Drawing Sheets

ELECTRONIC COLLAR FOR LOCATING AND TRAINING ANIMALS

BACKGROUND OF THE INVENTION

This invention relates to the field of electronic animal collars, more particularly, an intelligent training collar for use by animal owners to achieve more effective control over an animal by extending the range over which the owner may communicate with the animal.

Existing electronic programmable animal collars provide only one specialized function. Therefore, an objective of the present inventory is the provision of an electric animal collar which consolidates a plurality of locating and training functions in one collar.

These and other objectives will be apparent from the description which follows.

SUMMARY OF THE INVENTION

The device of this invention includes two basic elements: 1) an electronic assembly attached to a collar strap mountable on the animal to be controlled, and 2) a programmable hand held transmitter.

The electronic assembly includes a microprocessor/microcontroller which is used to supervise the functions performed by the collar assembly. In addition, the microcontroller circuits may be programmed by use of the hand held transmitter, thus permitting the owner/operator to change the operation of the collar circuits remotely in the field without needing to physically handle the collar assembly.

The hand held transmitter (radio) has a DTMF (dual tone multiple frequency) touch pad like the touch pad on an ordinary touch dial telephone. The transmitter can be used to change modes of operation and multiple collars or devices. The transmitter also can be used for voice communication.

Various probes, sensors, and noise-making devices are also provided on the multi-purpose collar. These devices communicate with the hand held transmitter through the microcontroller.

An animal may be uniquely addressed with the collar. The collar may be programmed to respond to just one of hundreds of combinations of transmit frequencies and SAT (sub-audible tones). This greatly lessens the probability that an animal will receive unintended commands from another transmitter. Sat tones may be changed via hand held transmitter, thus will maintain the need to return the product to the factory to change the frequency of the unit.

DETAILED DESCRIPTION OF THE PREFERRED EMBODIMENT

Figure 1:
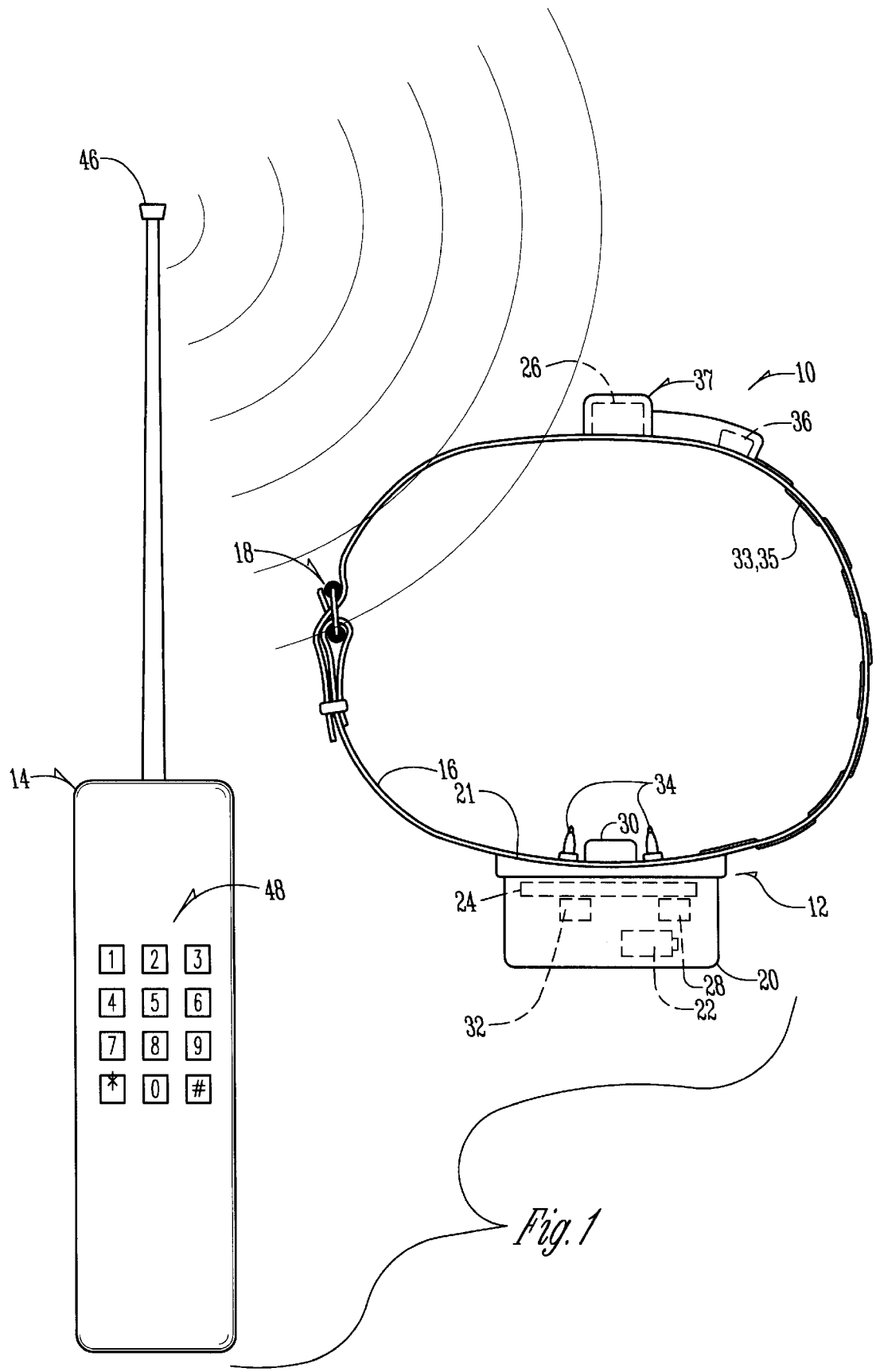
FIG. 1 is a perspective view of the collar of the present invention, including its transmitter.

The device of the present invention is generally depicted in FIG. 1 and denoted by the reference numeral 10. The device 10 includes an electronic collar assembly 12 which is mountable on an animal, preferably around the neck of the animal. A hand held radio transmitter 14 is provided for sending radio signals to the electronic collar assembly 12.

The hand held transmitter 14 is a conventional 2-way radio such as is available from most business radio dealerships. The preferred transmitter 14 is a SP50 ten channel radio manufactured by Motorola, Inc. of Boca Rotan, Fla. The transmitter 14 should include a touch tone keypad or touch pad 48 so as to permit the owner to broadcast DTMF signals to the collar assembly 12. One skilled in the art will appreciate that a one-way transmitter will suffice, but two-way transmitters are more common and would also allow two-way communication with other animal trainers in the vicinity.

The electronic collar assembly 12 includes a strap 16 equipped with a buckle 18 for securing the collar assembly 12 to the animal. Generally opposite the buckle 18, a casing 20 is attached to the strap 16 for housing the various electronic components of the electronic assembly 12. The casing 20 is sufficiently rigid so as to protect the electronic components contained therein from moisture and collisions.

Figure 2:
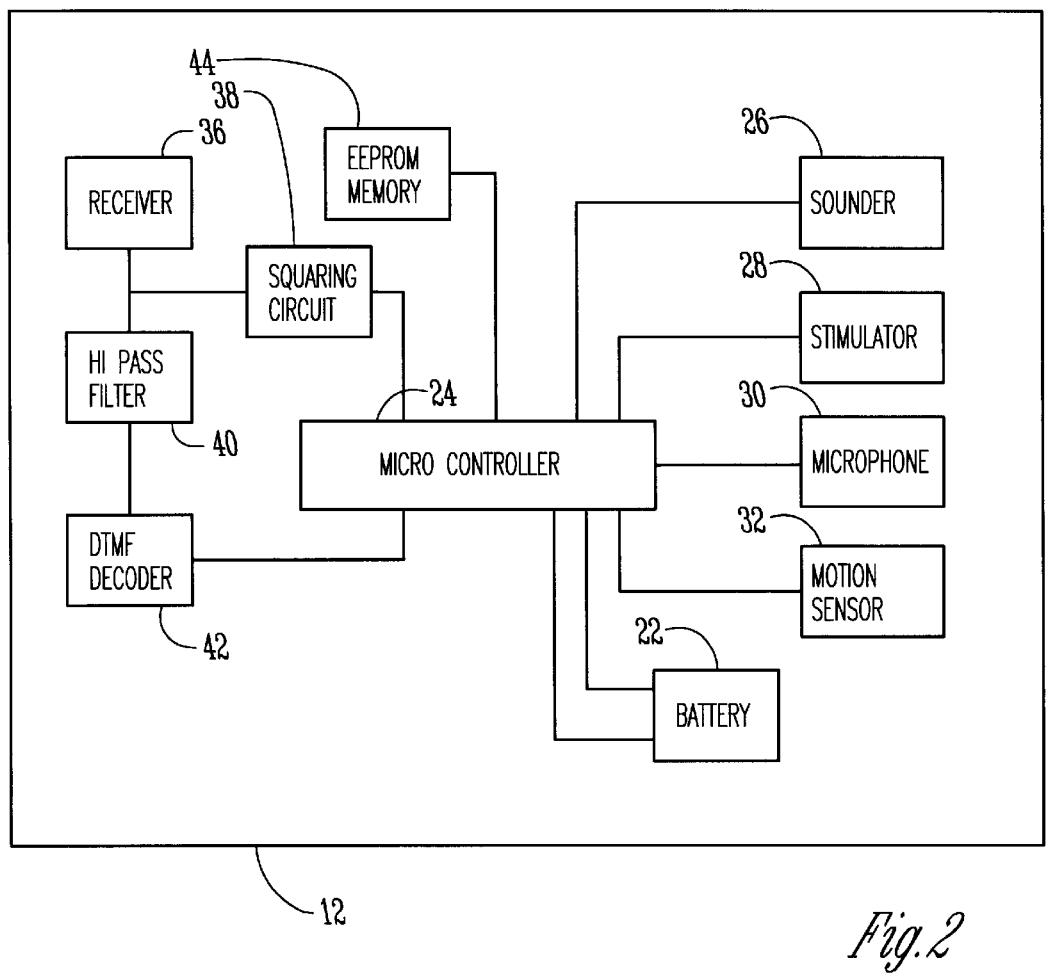
FIG. 2 is a block diagram illustrating the components of the electronic collar assembly of the present invention and their interconnection.

As can be understood from FIG. 2, various components are mounted on or in the casing 20. A source of electrical power, such as a battery 22 is provided on the electronic collar assembly 12. The battery 22 is in the voltage range of six to twelve volts direct current (VDC), and is preferably a conventional 9 volt direct current battery such as is widely available commercially. The battery 22 can be of either the rechargeable or non-rechargeable type, but is preferably replaceable. The battery 22 provides current to a microprocessor/microcontroller 24 and various other components connected thereto.

The preferred microprocessor/microcontroller 24 is an "INTEL" series 80C31/80C51. The microcontroller 24 is used to supervise the various functions performed by the collar assembly. The microcontroller can be programmed by use of the hand held transmitter 14.

The microcontroller 24 is electrically connected to a sounder mechanism 26, a stimulator 28, a sensor 30, and a tilt switch 32. The sounder mechanism 26 is an acoustic device mounted on the electronic collar assembly 12 which emits a sound, such as a tone or series of tone bursts. The stimulator 28 includes a pair of inwardly protruding probes 34 which are attached to the electronic collar assembly so as to be in contact with the neck of the animal wearing the collar. The sensor 30 includes a piezoelectric microphone or acoustic which detects when the animal is barking inappropriately. The microphone 30 is connected to the microcontroller 24. The tilt or acoustic probe switch 32 is also connected to the microcontroller 24 and indicates by sounding a tone or a series of tones when the animal is in a stationary position, such as when pointing during hunting.

A pager receiver 36 is connected to the microcontroller 24 through a squaring circuit 38, a high pass filter 40, and a DTMF (dual tone multiple frequency) decoder 42. The receiver 36 is a radio receiver, much like those used in a paging receiver. The receiver 36 receives radio signals from the hand held transmitter 14. The transmitter 14 must be adjusted to operate on the same radio frequency as the collar receiver 36, and must be programmed to broadcast a owner selected SAT tone each time the hand held radio is commanded to transmit. The receiver 36 has its own internal antenna and as such does not require an external antenna to be attached to the collar assembly 12. The radio receiver 36 is preferably from the Keystone series of paging receivers manufactured by Motorola, Inc. of Boca Rotan, Fla.

The microcontroller 24 includes an EEPROM (electrically erasable electrically programmable read only memory) 44. This allows the microcontroller 24 to be programmed with the hand held transmitter 14. The handheld transmitter is capable of two-way voice communication with a second similar hand-held transmitter of another trainer. It also capable of controlling a plurality of programmable microprocessors associated with a plurality of similar collars.

Operation of the Invention

The device 10 of this invention consolidates three main training and locating functions into one device, whereas most conventional devices are specialized to such a degree that a separate collar assembly is required for each of the three specific functions. The functions include: use as a locator, use for bark control, and use as a trainer.

Locator Function

The collar assembly 12 of this invention is provided with an acoustic sounder 26 which emits a periodic burst of sound so that the person working with the animal, for instance a dog, may determine by listening where the dog is located even though the dog may be blocked from vision by underbrush or other obstacles. In addition the operator may, by use of the hand held transmitter 14, place the sounder 26 into the following modes of operation:

a) continuous sounding—a tone is sounded at periodic intervals without the necessity of being actuated by the hand held transmitter 14;

b) selective sounding—activate the collar 12 (cause it to emit a sound) by pressing a button on the hand held transmitter 14; and c) sound on point—different tone or series of tone bursts is emitted when the dog is on point (as during hunting);

d) or combination of all of the above through programming of the transmitter.

The locator sounder 26 may be programmed to emit one of several distinctive tones or tone sequences. This allows the owner to distinguish the tones of their animal from nearby animals wearing similar collars.

Bark Control Function

The purpose of this function is to reduce and eliminate inappropriate barking of an animal.

The collar assembly 12 is outfitted with a microphone or probe 30 and electrical probes 34 which are in contact with the neck of the animal under control. The collar 12 is programmed to detect or sense through the microphone 30 when the animal is barking (not merely making whining or other low decibel level sounds), and then to provide stimulation through the electrical probes 34 to the animal if the barking is not stopped. Various levels of high voltages and varying pulse sequences may be applied across the probes 34 so as to deliver an unpleasant punitive stimulation (shock) to the animal wearing the collar assembly 12.

The device is such that various levels of stimulation may be utilized. This permits the stimulation level to be tailored according to the sensitivity of the particular animal.

The operator may program the assembly to apply increasing levels of stimuli (up to a preset level) if barking behavior is not ceased in a given period of time. After the passage of the preset amount of time, the warning/stimuli cycle is reset and the stimuli starts again from the lower initial level of stimulation.

Trainer Function

The purpose of the trainer function is to allow the owner to communicate more effectively with the animal being trained. The device 10 gives the owner the ability of applying both positive and negative stimuli to the animal via the use of the hand held transmitter 14 and the collar assembly 12.

The positive stimuli include distinctive tones issued by the sounder 26 on the collar. The animal would be conditioned to associate these sounds with proper behavior.

The corrective stimuli include owner selected levels of negative stimuli (shocks) to the animal should the animal's behavior be inconsistent with the response expected when the animal is given a specific command.

In order to train the dog in a desired position, the motion sensor could be used to cause the sounder to emit different sounds upon the movement of the animal. A first signal is generated by the motion sensor to cause the sounder to emit sounds when the animal assumes and remains in the desired position. A second signal is generated by the motion sensor to cause an interval between the sounds to decrease when the animal deviates from the desired position.

Address recognition

Signals from the hand held transmitter 14 are processed by the electronic collar assembly 12. The radio signal received by the receiver 36 is divided, with a portion of the signal going through the squaring circuit 38 prior to being presented to the microcontroller 24. The microcontroller 24 receives this signal and analyzes it to determine which, if any, SAT tone is being received. If the received SAT tone matches the tone for which the collar has been programmed, the microprocessor 24 will then receive and react to commands received by the DTMF circuits. Otherwise the received information will be ignored by the collar assembly 12.

The remaining portion of the received signal is that which passes through the high pass filter 40 which strips off the low frequency SAT tones. This higher frequency signal is expected to include DTMF tones. DTMF decoder circuits analyze the signals received and present the microcontroller with the results of this analysis (i.e. if the owner pressed the "3" number on the touch pad 48 of the hand held radio 14, the DTMF decoder would so advise the microcontroller that a "3" was received).

Microcontroller performance

The microcontroller performance is regulated by the software code which is contained in the collar circuits. The software code is conventional and is not the subject of this invention. The microcontroller 24 is programmed to respond to DTMF commands only if the correct SAT tone is received. The user may change the SAT tone in the field if necessary to avoid using the same SAT tone as used by another owner.

The owner will be provided with a chart showing the meanings of various sequences of DTMF commands as they relate to causing specific functions to be carried out by the collar assembly.

For example, a user may press a specific DTMF number on the transmitter 14 to cause the microcontroller 24 to go into the location function; then the user presses another key or number to set the type or mode of operation, i.e., to emit sound only when requested to do so by the hand held transmitter, then to set the specific tone sequence to be emitted when sound is to be emitted; then the user presses another key to end the programming of the collar. The collar will stay in this mode of operation until reprogrammed by the user. Similar sequences are used to establish other modes of collar operation.

The collar circuits will incorporate an EEPROM (electrically erasable electrically programmable read only memory) 44 circuit to achieve memory retention capability such that when the collar is programmed (such as to receive a given SAT tone), the programmed instructions will not be lost should electrical power be discontinued (such as during changes of the battery or periods when the collar assembly 12 is turned off).

Input sensors

The collar circuits include two input sensing devices. A piezoelectric microphone sensor or probe 30 detects when the dog is barking, this sensor 30 includes circuits which discriminate between barking and other sounds. A tilt switch 32 detects when the animal is active or still (as when the animal is on point). Each of these sensors is monitored by the microcontroller 24 and the information derived therefrom is used by the software algorithms to control the operation of the collar assembly 12.

Output transducers

The collar circuits include two basic types of output signals.

One circuit is used to provide positive feedback to the animal by emitting a low decibel level pleasing tone with the sounder 26. The dog will require conditioning to associate this tone with correct behavior.

The other circuit is used to provide negative feedback to the animal by shocking it with the probes 34 which contact the neck of the animal.

What is claimed is:

1. A device for locating an animal and controlling the animal's behavior, comprising:

a programmable hand held transmitter for selectively broadcasting distinct radio signals; wherein said hand-held transmitter further comprises a radio receiver, and is capable of two-way voice communication with a second similar hand-held transmitter;

a multi-function electronic collar assembly carried by a strap securable to the animal, the collar assembly having a radio signal receiver, a microprocessor, a sounder, a sound sensor and a motion sensor, and an electroshock stimulator thereon;

the microprocessor being connected to the receiver of said collar assembly and having an electrically programmable electronically erasable memory for being programmed by the transmitter;

the sounder being operatively connected to the microprocessor for generating sounds audible to the animal in response to a signal from the microprocessor, at least some of the sounds being humanly audible and thereby indicative of the location of the animal, at least some of the sounds being pleasing to the animal;

the sound sensor being electrically connected to the microprocessor for indicating to the microprocessor when the animal emits undesirable sounds;

the electroshock stimulator being operatively connected to the microprocessor for applying electroshock stimulus to the animal when the animal exhibits undesirable behavior including when the animal emits said undesirable sounds;

the motion sensor being connected to the microprocessor for indicating to the microprocessor when the animal moves;

whereby the transmitter can selectively broadcast one of the distinct radio signals to the microprocessor through the receiver of said collar assembly to respectively place the electronic collar assembly in any one of a plurality of modes including a locating mode and a behavior controlling mode.

2. The device of claim 1 wherein the transmitter has a dual tone multiple frequency keypad thereon capable of sending said distinct radio signals and sub-audible tones.

3. The device of claim 2 wherein a squaring circuit and a decoder are operatively interposed between the receiver of said collar assembly and the microprocessor for screening said sub-audible tones and said distinct radio signals and passing only authorized tones and signals to the microprocessor.

4. The device of claim 1 wherein the sound sensor is a piezoelectric microphone.

5. The device of claim 1 wherein the motion sensor is a tilt switch.

6. The device of claim 1 wherein the animal is a canine and the undesirable sounds are barking noises.

7. The device of claim 1 wherein the transmitter has a sub-audible tone generator.

8. The device of claim 1 wherein the electrically programmable electrically erasable memory of the microprocessor is programmable and erasable by using a keypad on the transmitter.

9. The device of claim 1 further comprising a decoder for receiving signals from the transmitter through the receiver of said collar assembly and decoding said signals and forwarding decoded signals to the microprocessor.

10. The device of claim 1 wherein the receiver of said collar assembly is a pager receiver.

11. The device of claim 1 wherein tone volumes and intervals from said sounder can be programmed and selected from the transmitter without any change to the collar assembly.

12. A method for training an animal to maintain a desired position, comprising:

attaching to the animal a single electronic collar assembly having a sounder and an electroshock stimulator thereon responsive to a signal from a remote transmitter, the collar assembly further including a motion sensor thereon for sending a signal indicative of the position of the animal to the stimulator and said sounder;

transmitting a mode selection signal from the remote transmitter to a microprocessor of said collar assembly for selecting a locating mode which utilizing the sounder and a behavior controlling mode which utilizing the motion sensor, the stimulator and the sounder;

generating a first signal from the motion sensor to cause the sounder to emit sounds when the animal assumes and remains in the desired position; and generating a second signal from the motion sensor so as to cause an interval between the sounds to decrease when the animal deviates from the desired position.

13. A device for locating an animal and controlling the animal's behavior, comprising:

a hand held transmitter for selectively broadcasting distinct radio signals; wherein said hand-held transmitter further comprises a radio receiver, and is capable of two-way voice communication with a second similar hand-held transmitter;

a single multi-function electronic collar assembly securable to the animal and having a radio signal receiver, a microprocessor, a sounder, and an electroshock stimulator thereon;

the microprocessor being connected to the receiver of said collar assembly, the sounder and the stimulator;

whereby the transmitter can selectively broadcast one of the distinct radio signals to the microprocessor through the receiver to respectively place the electronic collar assembly in any one of a plurality of operating modes including a locating mode utilizing the sounder and a behavior controlling mode utilizing the stimulator; and a motion sensor and a sound sensor mounted on the collar assembly and connected to the microprocessor, the sound sensor being utilized in the behavior controlling mode to indicate when the animal barks, the motion sensor being utilized in the behavior controlling mode to indicate when the animal is in a pointing position.

14. A device for locating an animal and controlling the animal's behavior, comprising:

a hand held transmitter for selectively broadcasting distinct radio signals;

a multi-function electronic collar assembly carried by a strap securable to the animal, the collar assembly having a radio signal receiver, a microprocessor, a sounder, a sound sensor and a motion sensor, and an electroshock stimulator thereon;

the microprocessor being connected to the receiver;

the sounder being operatively connected to the microprocessor for generating sounds audible to the animal in response to a signal from the microprocessor, at least some of the sounds being humanly audible and thereby indicative of the location of the animal, at least some of the sounds being pleasing to the animal;

the sound sensor being electrically connected to the microprocessor for indicating to the microprocessor when the animal emits undesirable sounds;

the electroshock stimulator being operatively connected to the microprocessor for applying electroshock stimulus to the animal when the animal exhibits undesirable behavior including when the animal emits said undesirable sounds;

the motion sensor being connected to the microprocessor for indicating to the microprocessor when the animal moves;

whereby the transmitter can selectively broadcast one of the distinct radio signals to the microprocessor through the receiver to respectively place the electronic collar assembly in any one of a plurality of modes including a locating mode and a behavior controlling mode;

the microprocessor being receptive to signals from the transmitter and the motion sensor, in response to a first signal from the transmitter, the microprocessor commands the sounder to emit a tone at periodic intervals for locating the animal, and in response to a second signal different from the first signal, the microprocessor commands the sounder to emit a tone only when a button on a keypad of the transmitter is depressed, and in response to a third signal from the motion sensor indicating that the animal has assumed a pointing position, the microprocessor commands the sounder to emit a sound that is pleasing to the animal so as to encourage the animal to maintain the pointing position.

15. A programmable apparatus for use with an animal comprising:

a collar adapted to be secured to the animal;

a radio receiver coupled to the collar;

a programmable hand-held transmitter having a keypad for selectively transmitting control signals to the radio receiver of said collar; wherein said hand-held transmitter further comprises a radio receiver, and is capable of two-way voice communication with a second similar hand-held transmitter; wherein said hand-held transmitter is also capable of controlling a plurality of programmable microprocessors associated with a plurality of similar collars;

a set of probes coupled to the collar for applying electrical stimulation to the animal wearing the collar;

a sound emitting device coupled to the collar for emitting audible sounds; and a programmable microprocessor electrically connected to the radio receiver of said collar, the set of probes, and the sound emitting device, wherein the microprocessor performs the processing steps of:

receiving the control signals from the transmitter via the radio receiver of said collar, and placing the collar in one of a plurality of programmable operational modes in response to the control signals received from the transmitter, wherein each of the plurality of programmable operational modes involve the use of at least one of the set of probes and the sound emitting device.

16. The apparatus of claim 15 further comprising a motion sensor coupled to the collar and electrically connected to the microprocessor, wherein each of the plurality of programmable operational modes involve the use of at least one of the set of probes, the sound emitting device, and the motion sensor.

17. The apparatus of claim 15 further comprising a microphone and electrically connected to the microprocessor, wherein each of the plurality of programmable operational modes involve the use of at least one of the set of probes, the sound emitting device, and the microphone.

18. The apparatus of claim 15 wherein the hand-held transmitter transmits the control signals over a selected frequency and with a selected sub-audible tone (SAT).

19. The apparatus of claim 18 wherein the microprocessor distinguishes signals transmitted by the hand-held transmitter from signals transmitted from other sources by analyzing the sub-audible tone.

20. The apparatus of claim 15 wherein the control signals further comprise command signals for controlling the operation of collar and programming signals for programming the programmable microprocessor.

21. The apparatus of claim 15 wherein the electrical stimulation applied to the animal by the set of probes can be applied at a number of progressively higher levels, and wherein the applied level is programmable.

22. The apparatus of claim 15 wherein the audible sounds emitted by the sound emitting device are programmable.

* * * * *